(12) United States Patent
Lin et al.

(10) Patent No.: US 10,335,714 B2
(45) Date of Patent: Jul. 2, 2019

(54) LIQUID RECOVERY FILTER

(71) Applicant: Saint-Gobain Performance Plastics Corporation, Solon, OH (US)

(72) Inventors: ZhenWu Lin, Pasadena, CA (US); Jacob Andrews, Washington, DC (US)

(73) Assignee: SAINT-GOBAIN PERFORMANCE PLASTICS Corporation, Solon, OH (US)

( * ) Notice: Subject to any disclaimer, the term of this patent is extended or adjusted under 35 U.S.C. 154(b) by 0 days.

(21) Appl. No.: 15/700,361

(22) Filed: Sep. 11, 2017

(65) Prior Publication Data

US 2017/0368479 A1     Dec. 28, 2017

Related U.S. Application Data

(62) Division of application No. 13/460,583, filed on Apr. 30, 2012, now Pat. No. 9,757,666.

(60) Provisional application No. 61/992,029, filed on May 12, 2014.

(51) Int. Cl.
| | |
|---|---|
| *B01D 19/00* | (2006.01) |
| *B01D 29/21* | (2006.01) |
| *B01D 36/00* | (2006.01) |
| *B01D 35/16* | (2006.01) |

(52) U.S. Cl.
CPC ......... *B01D 19/0031* (2013.01); *B01D 29/21* (2013.01); *B01D 35/16* (2013.01); *B01D 36/001* (2013.01)

(58) Field of Classification Search
CPC .. B01D 36/001; B01D 19/0031; B01D 29/21; B01D 35/16

USPC .................................................. 210/453, 436
See application file for complete search history.

(56) References Cited

U.S. PATENT DOCUMENTS

| | | | | |
|---|---|---|---|---|
| 5,776,342 A | * | 7/1998 | Hiranaga ............. | B01D 27/005 210/442 |
| 5,858,232 A | * | 1/1999 | Meissner ............... | B01D 24/04 210/450 |
| 2002/0056675 A1 | * | 5/2002 | Hegde ................ | B01D 19/0031 210/188 |
| 2014/0048469 A1 | | 2/2014 | Wilder et al. | |

FOREIGN PATENT DOCUMENTS

WO    WO 2000/047310 A2    8/2000

* cited by examiner

*Primary Examiner* — Claire A Norris
(74) *Attorney, Agent, or Firm* — Lorusso & Associates (57) ABSTRACT

The liquid recovery filter includes several embodiments, each of which provides for the recovery of liquid otherwise trapped within the filter housing and element. Each embodiment includes a series of vents, purge ports, and passages that communicate fluidly with the filter housing and filter core. Certain vents and purge ports are initially opened following filtration operations to allow pressurized gas to flow into the housing, thereby forcing residual unfiltered liquid through the filter. When this has been accomplished, another vent is opened to the filter core to allow filtered liquid to flow from the downstream or outlet passage from the filter core. Some embodiments have the filter outlet located above the filter, and include a downstream drain port extending from the filter core. The downstream drain port provides for the recovery of filtered liquid when the vent or purge port is opened in these embodiments.

20 Claims, 6 Drawing Sheets

LIQUID RECOVERY FILTER

CROSS REFERENCE TO RELATED APPLICATIONS

This is a divisional of U.S. Regular Utility application Ser. No. 13/460,583 filed Apr. 30, 2012, now U.S. Pat. No. 9,757,666, issued Sep. 12, 2017, the contents of which are incorporated herein by reference and to which a claim of priority is made.

BACKGROUND OF THE INVENTION

1. Field of the Invention

The present invention relates generally to filtration devices and systems, and particularly to a liquid recovery filter having an inlet and outlet vent and purge ports for the drainage and recovery of unfiltered and filtered liquids from the filter housing and core after filtering operations.

2. Description of the Related Art

Innumerable filtration devices and systems have been developed for the cleaning and purification of a wide range of gases and liquids. One area that requires extremely high quality filtration is in the field of pharmaceutical manufacture, where a number of different liquids are involved in the manufacturing processes of a large number of drugs and medications. These various liquids are often quite costly to produce, and as a result, much effort is expended to recover such liquids during the manufacturing process, insofar as practicable.

One of the means used to recover such liquids is through the use of various filters. The liquid is passed through the filter(s) and the purified liquid is recovered from the downstream or outlet side of the filter. The filter elements of such filters conventionally have a generally toroidal configuration, the unfiltered liquid passing through the filter element from the outside and through the filter material to the hollow inner core, although other configurations are certainly feasible. One problem with such filter configurations is that when the filter is replaced, there is a volume of purified, filtered liquid still contained in the hollow core of the filter element within the filter housing or shell, as well as unfiltered liquid remaining within the filter housing and outside of the filter element. These liquids are often quite valuable, as noted further above, and discarding these liquids when the filter is periodically removed and replaced results in the loss of a considerable amount of valuable liquid over some period of time.

Thus, a liquid recovery filter solving the aforementioned problems is desired.

SUMMARY OF THE INVENTION

The liquid recovery filter comprises a number of embodiments, each of the embodiments including a filter housing or shell containing a generally tubular filter element therein. All of the embodiments have an inlet extending into the upstream or inlet side of the shell, and an outlet extending from the core or downstream portion of the filter element. The terms "inlet," "inlet side," "upstream," "upstream side," and similar terms all refer to the portion or volume of the filter assembly located on the inlet portion of the device, i.e., between the filter housing or shell and the outer surface of the filter element containing unfiltered liquid during operation of the filter. The terms "outlet," "outlet side," "downstream," "downstream side," and similar terms is all refer to the volume of the filter assembly located within the core of the filter element containing filtered liquid that has passed through the filter element during operation of the filter. The filter element defines the liquid permeable barrier between the upstream or inlet side and the downstream or outlet side of the assembly. Thus, all liquid must pass through the filter element from the inlet port to the outlet port of the filter assembly.

The filter housing or shell also has an upstream or inlet side vent or purge port or passage, and an upstream or inlet side drain port or passage. These two upstream ports or passages allow the outer portion of the filter shell or housing to be drained of unfiltered liquid, i.e., liquid that has not passed through the filter element from the upstream or inlet side to the downstream or outlet side of the filter.

Each of the liquid recovery filter embodiments further includes a downstream or outlet side vent or purge port or passage that communicates fluidly with the interior or downstream core of the filter element. This downstream or outlet purge port is normally closed during filtering operations, but is opened when the filtration operation has been completed. The opening of this downstream vent or purge port allows air or other gas to flow into the core of the filter, thus "breaking the seal" or hydraulic lock that is formed within the core of the filter when the inlet and outlet valves or ports are closed. This allows the valuable filtered liquid contained within the core of the filter element to flow from the filter assembly for recovery and reuse.

Two basic configurations of the liquid recovery filter are disclosed herein, one having a downstream or outlet port disposed at the bottom of the filter assembly, and the other having its downstream or outlet port disposed at or near the top of the assembly. The second of these configurations includes an additional downstream drain port or passage at the bottom of the assembly to allow liquid to flow from the core of the filter by gravity. The first basic configuration, i.e., having the main outlet port or passage disposed below the filter assembly, includes three different embodiments, which differ due to the different locations or arrangements of the primary inlet and outlet ports or passages. The second basic configuration, i.e., having the main outlet port or passage extending from the top or upper portion of the filter assembly, includes two additional embodiments, which also differ due to the different arrangements of the primary inlet and outlet ports or passages. However, each of the embodiments disclosed herein includes means for draining filtered liquid from the core of the filter element.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The liquid recovery filter comprises several embodiments, which are each configured for the recovery of liquids within the filter shell or housing and filter element after the completion of filtration operations, e.g., when a batch has been filtered and/or the filter is to be changed, etc. While the filter shells or housings of the various liquid recovery filter embodiments are shown in the drawings as being permanently sealed structures (with the exception of their various inlet and outlet ports or passages), it will be seen that the filter shells or housings may be constructed as reusable units, permitting access to the filter element therein for replacement or cleaning and reuse.

Figure 1:
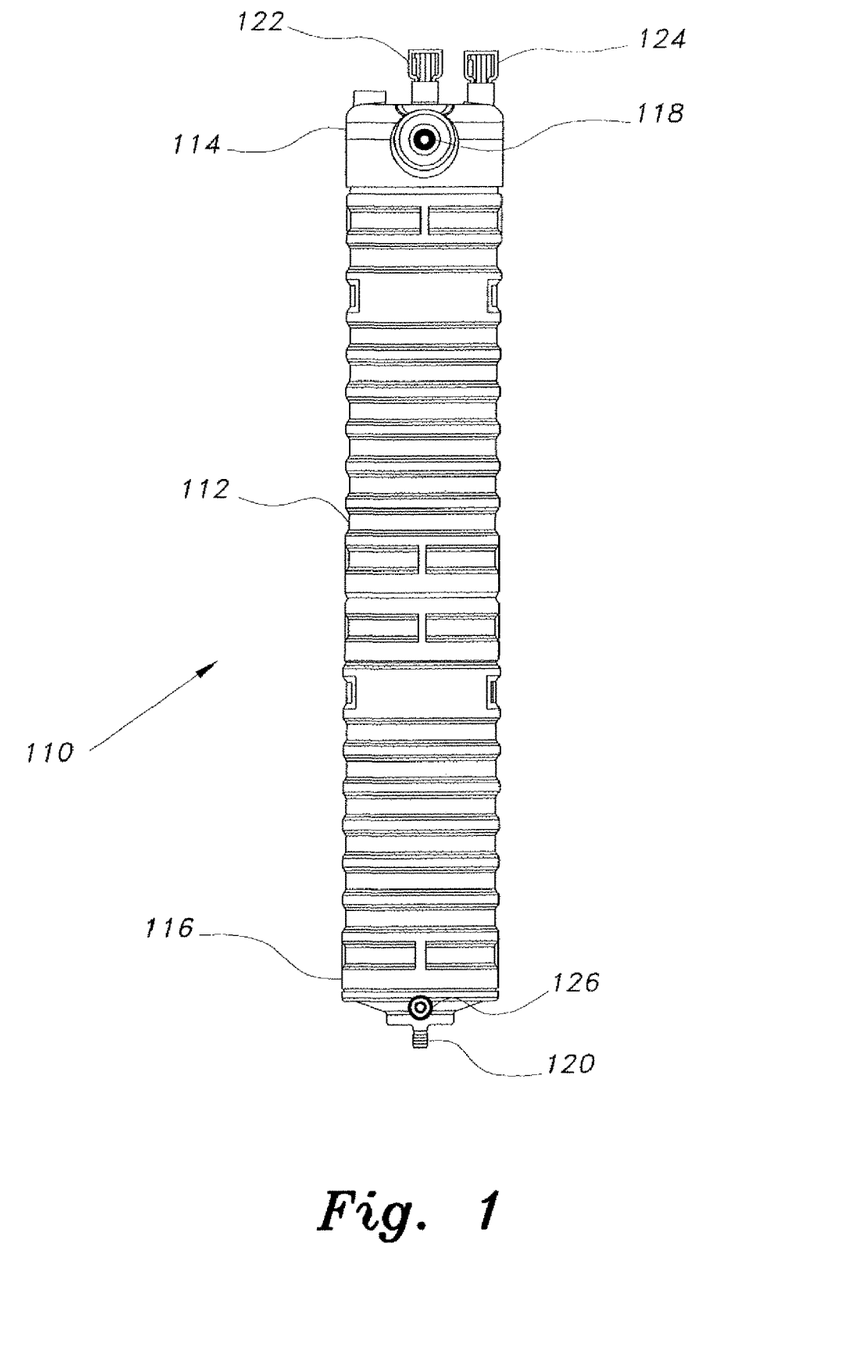
FIG. 1 is a front elevation view of a first embodiment of a liquid recovery filter according to the present invention, illustrating its general external configuration.

FIG. 1 of the drawings provides a front elevation view of the liquid recovery filter 110. The liquid recovery filter or filter 110 of FIG. 1 includes an outer filter shell or housing 112 having an upper or inlet end 114 and an opposite lower or outlet end 116, in addition to the outer cylindrical wall 112. The filter 110 will normally be oriented as shown in FIG. 1, with the inlet end 114 disposed above the outlet end 116. The filter 110 includes an upstream or inlet passage or port 118, a generally opposite downstream or outlet passage or port 120 for the flow of filtered liquid from the device, an outlet vent passage 122 serving as a vent to the outlet side of the filter assembly, i.e., to the internal volume of the filter element contained within the housing or shell 112, an upstream vent passage 124 communicating with the internal volume of the device between the shell or housing 112 and the filter element therein, and an upstream drain passage 126 for draining liquids from the internal volume between the shell 112 and the internal filter.

All of the embodiments of the liquid recovery device include these various vents, ports, and passages. However, the relationship and orientation of the various vents, ports, and passages are arranged differently in different embodiments. Some embodiments also include an additional port or passage to accommodate the specific arrangement or orientation of the other ports and passages. The locations and orientations of the various ports and passages 118 through 126 of the liquid recovery filter 110 of FIG. 1 most closely resemble the configuration of the liquid recovery filter embodiment of FIG. 4, discussed in detail further below. Moreover, while the liquid recovery filter 110 of FIG. 1 is shown having a relatively tall and narrow configuration, it will be understood that other configurations may be provided, depending upon the shape and configuration of the filter element contained therein, the placement of the various inlet and outlet ports or passages, and other factors. The various fittings and connectors for the various ports and passages of the filter 110 are conventional in the industry.

Figure 2:
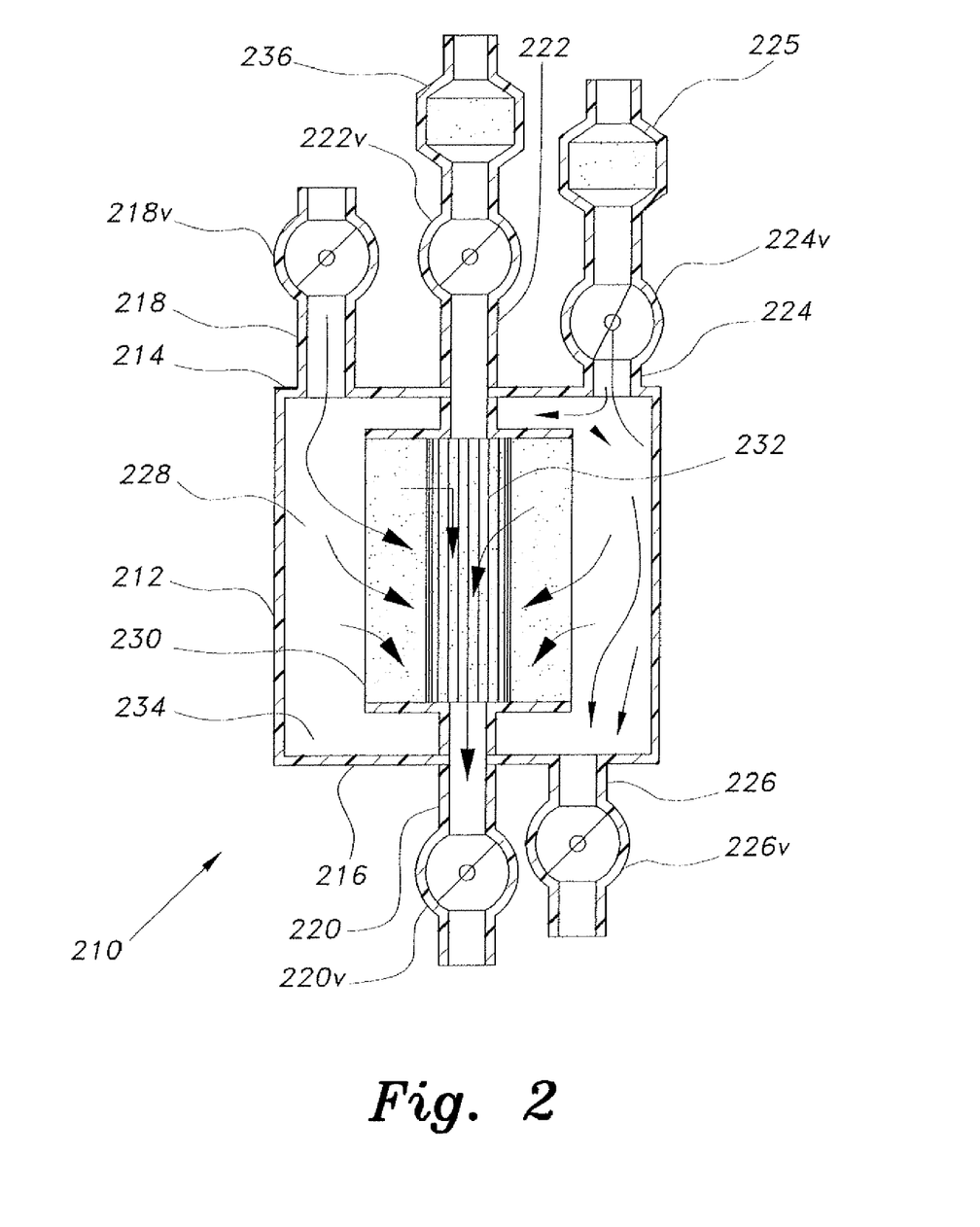
FIG. 2 is an elevation view in section of a liquid recovery filter according to the present invention having a generally inline flow path, illustrating its internal configuration.

FIG. 2 of the drawings provides an elevation view in section of another embodiment of the liquid recovery filter, designated as filter 210. It will be understood that while the filter 210 is considerably shorter and somewhat wider than the filter 110 of FIG. 1, the length and width of any of the filter embodiments illustrated in the drawings are not limiting, and will depend upon the configuration of the filter element installed therein according to the intended use and operating environment. The filter 210 includes a housing or shell 212 having an inlet end 214 and an opposite outlet end 216. An inlet passage 218 extends from the inlet end 214 of the shell 212 axially parallel to the length of the filter, as defined by its inlet and outlet ends. An outlet passage 220 extends coaxially (with the filter) from the opposite lower outlet end 216 of the shell 212. An outlet vent passage 222 extends from the upper inlet end 214 of the filter shell or housing 212. The outlet vent passage 222 communicates with the outlet portion or core of the filter disposed within the housing or shell 212, as described in detail further below. An upstream vent passage 224 also extends from the inlet end 214 of the shell 212 for the purpose of venting the internal volume of the filter shell 212 that surrounds the filter element therein. Finally, an upstream drain passage 226 extends from the outlet end 216 of the shell 212 for draining liquids from the internal volume between the shell 112 and internal filter. This general external configuration will be seen to be similar to the filter 110 of FIG. 1, with the exception of the orientation of the inlet passage 218 and the upstream drain passage 226.

The filter shell or housing 212 defines an internal volume 228 having a filter element 230 disposed therein. The filter element preferably has a generally toroidal configuration and a hollow outlet core 232. The filter shell or housing 212 and the filter element 230 contained therein define an upstream or inlet volume portion 234 between the filter shell 212 and the outer surface of the liquid permeable filter element 230. Unfiltered liquid enters the upstream volume 234 of the filter 210 via the upstream or inlet passage 218 and passes through the liquid permeable filter element 230 to the hollow outlet core 232 of the filter element 230, and then exits the filter 210 through the outlet port 220 as filtered liquid.

It will be noted that each of the various passages or ports 218 through 226 includes a valve therein. The valves are designated as valves 218v through 226v, respectively. The valves 218v through 226v are shown schematically in FIG. 2, and may be any suitable type of valve. During normal filtering operations, only the inlet valve 218v and the outlet valve 220v will be open, the other three valves 222v, 224v, and 226v remaining closed. Thus, liquid passing through the filter 210 must pass from the upstream or inlet volume 234 through the permeable filter element 230, and into the hollow core 232 of the filter element 230 as filtered liquid before leaving the filter 210 through the downstream or outlet port or passage 220.

The above-described operation presents no problems with liquid recovery, so long as the operation is essentially continuous. However, when the liquid stream must be interrupted for some reason, e.g., cleaning the liquid delivery lines or passages, changing batches of liquid, replacing the filter or filter element, etc., the flow of liquid through the filter 210 must be shut off. This is easily accomplished by closing the inlet and outlet passage valves 218v and 220v, but this leaves some quantity of both unfiltered and filtered liquid within the filter housing or shell 212. As this liquid is often quite valuable in the pharmaceutical industry, it represents a fairly substantial financial cost or loss if it is discarded when the filter 210 is removed or replaced. Moreover, there may be additional costs associated with disposing of a filter containing such a liquid, if the liquid is considered to be a biohazard or requires special handling in some manner.

The various embodiments of the liquid recovery filter described herein respond to this problem by providing for the filter housing or shell to be drained of liquid therein when the filtering operation is terminated, thus recovering the valuable liquid within the filter. This is accomplished by means of the outlet vent passage 222, the upstream or inlet volume vent passage 224, and the upstream or inlet volume drain passage 226. When filtering operations are terminated and the remaining liquid trapped within the filter 210 is to be drained, the primary inlet passage valve 218v is closed to terminate liquid flow through the filter 210. Filtration of the unfiltered liquid remaining within the unfiltered upstream or inlet side volume portion 234 of the filter 210 is accomplished by forcing it through the filter element 230 to flow as processed or filtered liquid from the filter outlet passage 220.

A brief discussion of the characteristics of a conventional filter element 230 is appropriate at this point. Filter elements used in many areas of the pharmaceutical industry, and other industries and operations for that matter, often provide extremely fine filtration. The level or degree of filtration is often quantified according to the "bubble point" of the filter, i.e., the differential pressure required to force air (or other gas) through the wetted filter element. This pressure is equal to the pressure required to force the liquid through the pores of the wetted filter. Finer porosity requires a greater differential pressure between the inlet and the outlet of the filter assembly. The bubble point test also serves as a test or check of the integrity of the filter element. The bubble point of many filters used in the pharmaceutical industry may be 45 psi, or even higher, so that the pressure required to force a liquid of higher viscosity through the filter during operation is even greater.

Returning to the present liquid recovery filter, it is not sufficient merely to open the upstream vent passage valve 224v to allow flow through the filter assembly 210. Rather, air (or other gas) must be applied to the open upstream vent passage 224 at sufficient pressure to force the residual unfiltered liquid through the filter element 230 and out the outlet passage 220 of the filter assembly 200. The upstream vent passage 224 preferably includes an inline filter 225 therein to preclude contamination of the liquid being forced through the filter element 230 by the air or gas introduced through the upstream vent passage 224. In this manner, most of the unfiltered liquid within the filter assembly 210 is filtered, to be recovered as filtered and processed liquid, as was accomplished during standard filter operation.

Once the recovery of unfiltered liquid has been accomplished, as described above, any remaining unfiltered liquid in the filter housing 212 but outside of the filter element 230 is removed from the filter by opening the lower upstream volume drain passage valve 226v, the counterpart upstream volume vent passage valve 224v remaining open per the liquid recovery operation described above. This allows any remaining residual unfiltered liquid to flow freely from the filter housing or shell 212.

The valuable filtered liquid remaining in the core 232 of the filter element 230 is recovered by opening the outlet vent passage valve 222v at the opposite end of the filter 210. The outlet passage 220 remains open, as in the initial liquid recovery operation described further above. This allows the remaining filtered liquid within the core 232 of the filter element 230 to drain from the filter 210 for recovery. A gas (air, nitrogen, carbon dioxide, etc., as appropriate) may be introduced into the filter core 232 through the outlet vent passage 222 to assist in the removal of liquid from the core, particularly if the liquid is relatively viscous. The outlet vent passage 222 may include an inline filter 236 therein to preclude contamination of the filtered liquid being removed from the filter core 232 by the air or gas introduced through the vent passage 222.

Figure 3:
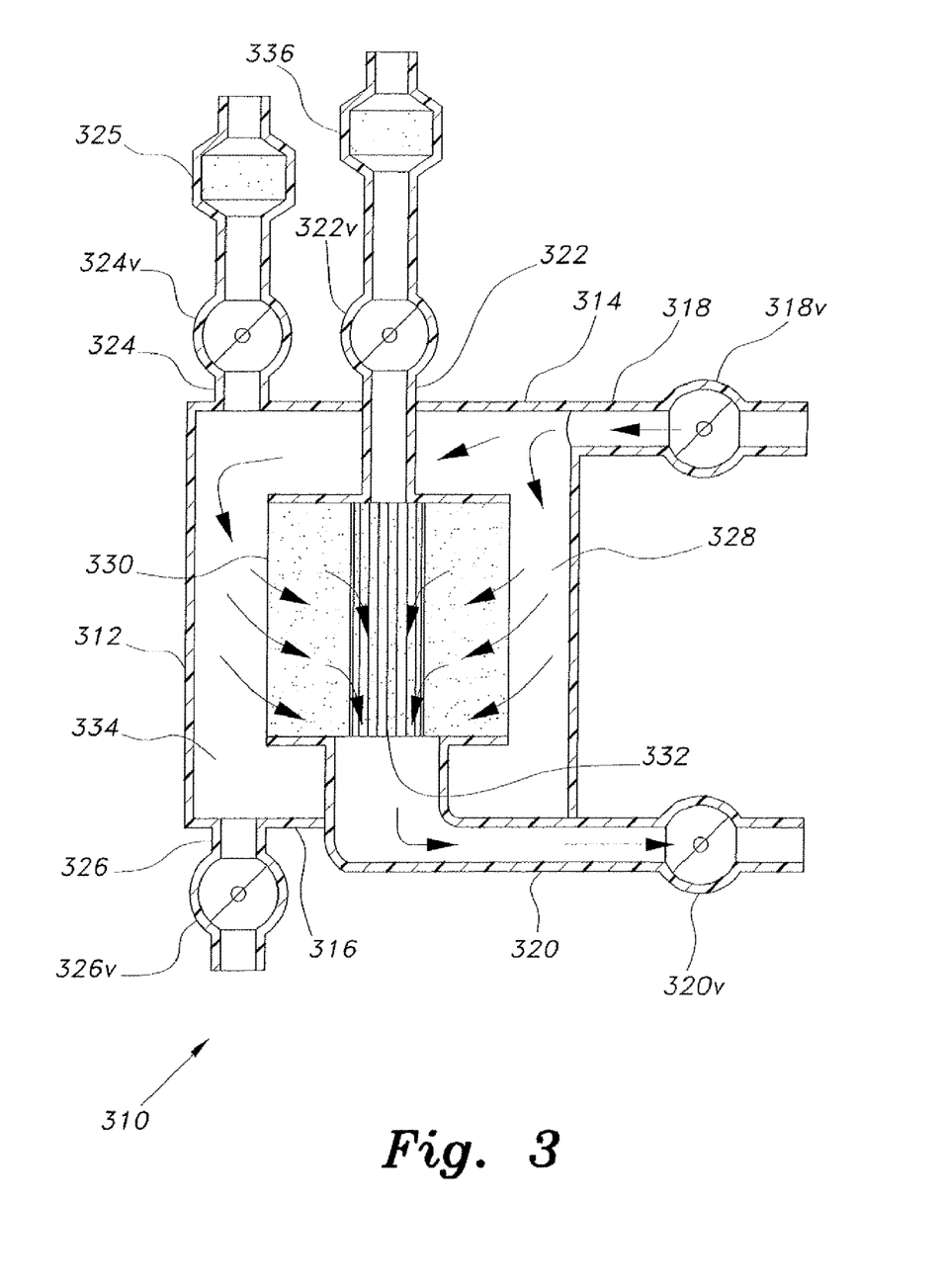
FIG. 3 is an elevation view in section of a liquid recovery filter according to the present invention having a generally C-shaped flow path, illustrating its internal configuration.

FIG. 3 provides an elevation view in section of an alternative embodiment of the liquid recovery filter 310. The filter 310 includes all of the components and elements described further above for the filter 210, i.e., a filter housing or shell 312 having mutually opposed first or upper and second or lower ends 314 and 316 defining an interior volume 328, and a toroidal filter element 330 captured therein. The filter element 330 and the surrounding housing or shell 312 define an upstream or inlet volume 334 therebetween. The filter clement 330 has a hollow core 332. An upstream vent passage 324 and its valve 324v extend from the upper or inlet end 314 of the shell 312. An opposite upstream or inlet side drain passage 326 and its valve 326v extend from the lower or downstream or outlet end 316 of the filter housing or shell 312.

The difference between the filter 210 of FIG. 2 and the filter 310 of FIG. 3 lies in the orientation of their respective inlet and outlet ports or passages. It will be seen in FIG. 3 that the upstream or inlet port or passage 318 and its valve 318v extend radially from the upper end 314 of the filter housing or shell 312. The downstream or outlet port or passage 320 and its valve 320v extend from the filter core 332 radially from the lower or outlet end 316 of the filter shell or housing 312. This configuration may be more readily installed in certain processing systems than the inline configuration of the filter 210 of FIG. 2. The liquid flow paths through the filter 310 during normal filtering operations and during the draining or purging of the filter 310 are substantially the same as those described further above for the filter 210.

The outlet vent passage valve 322v, the upstream vent passage valve 324v, and the upstream drain passage valve 326v are closed during normal filtering operations, i.e., when the upstream or inlet and downstream or outlet valves 318v and 320v are open to permit flow through the filter 310. Draining or purging of liquid from the filter 310 is accomplished in the same manner as described further above for the filter 210, i.e., the inlet valve 318v is closed and the upstream vent passage valve 324v is opened to allow pressurized gas to force unfiltered liquid from the upstream volume portion 334 of the filter housing 312 through the filter element 330. The pressurized gas preferably passes through an inline filter 325 installed in the upstream vent passage 324. Once all of the liquid that can be purged through the filter element 330 has been recovered, any remaining unfiltered liquid in the filter housing 312 but outside of the filter element 330 is removed from the filter by opening the lower upstream volume drain passage valve 326v, the counterpart upstream volume vent passage valve 324v remaining open per the liquid recovery operation described above. This allows any remaining residual unfiltered liquid to flow freely from the filter housing OT shell 312. The upstream volume vent passage valve 324v and upstream volume drain passage valve 326v are then closed and the outlet vent passage valve 322v is opened to allow the remaining filtered liquid to drain or to be purged or flushed from the filter core 332.

Figure 4:
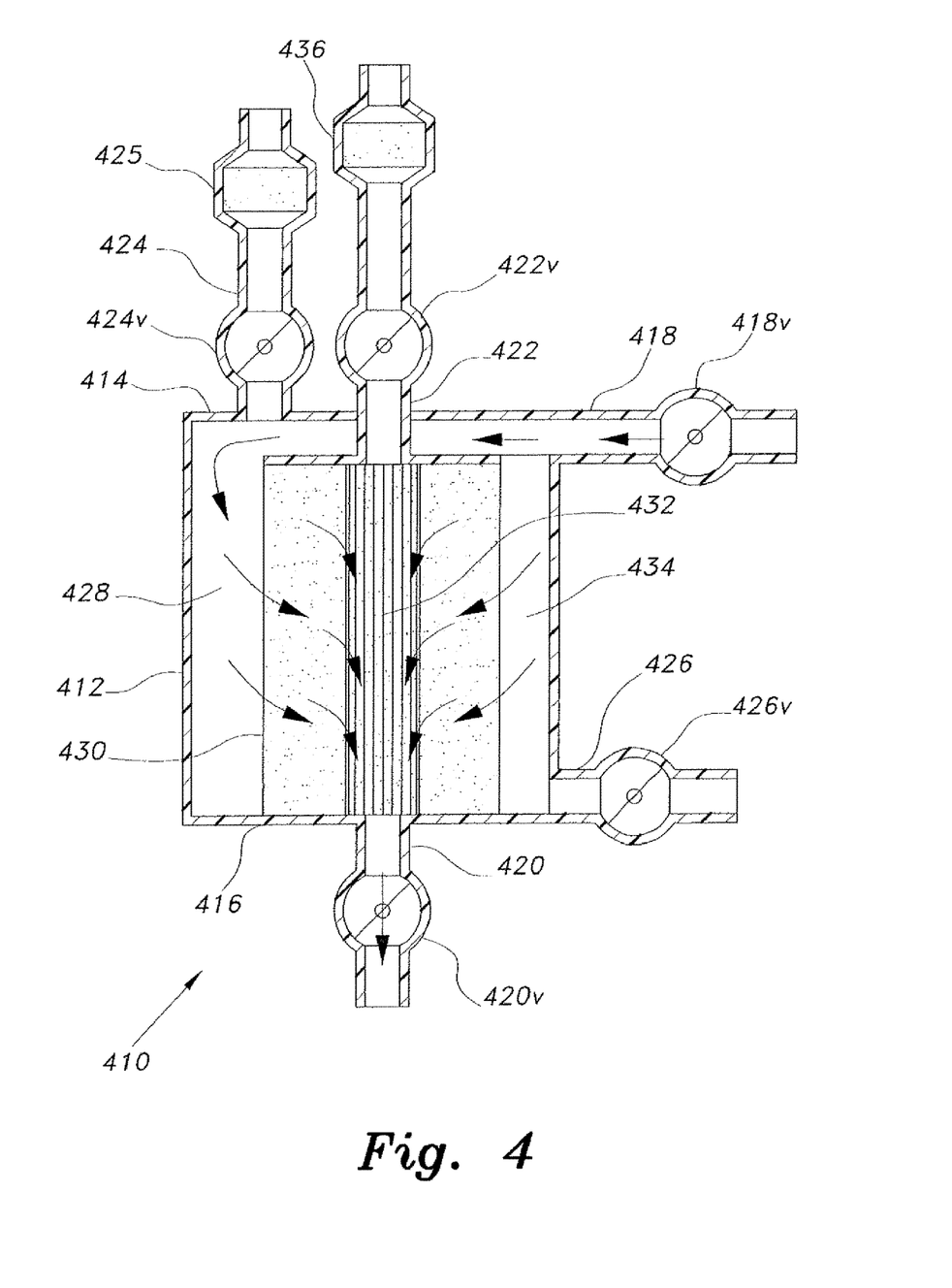
FIG. 4 is an elevation view in section of a liquid recovery filter according to the present invention having a generally L-shaped flow path, illustrating its internal configuration.

FIG. 4 provides an elevation view in section of another alternative embodiment of the liquid recovery filter, designated as filter 410. The filter 410 includes all of the components and elements described further above for the filters 210 and 310, i.e., a filter housing or shell 412 having mutually opposed first (or upper) and second (or lower) ends 414 and 416 defining an interior volume 428, and a toroidal filter element 430 captured therein. The filter element 430 and the surrounding housing or shell 412 define an upstream or inlet volume 434 therebetween. The filter element 430 has a hollow core 432. An upstream vent passage 424 and its valve 424*v* extend from the upper or inlet end 414 of the shell 412. An opposite upstream or inlet side drain passage 426 and its valve 426*v* extend from the lower or downstream or outlet end 416 of the filter housing or shell 412.

The filter 410 of FIG. 4 might be considered a hybrid of the filters 210 of FIGS. 2 and 310 of FIG. 3. The upstream or inlet passage 418 of the filter 410 extends radially from the upper end 414 of the filter housing or shell 412 in substantially the same orientation as the corresponding component 318 of the filter 310 of FIG. 3. However, the downstream or outlet passage 420 extends coaxially from the filter shell 412 in the manner of the outlet passage 220 of the filter 210 of FIG. 2. This configuration provides further installation options.

The liquid flow paths through the filter 410 during normal filtering operations and during the draining or purging of the filter 410 are substantially the same as those described further above for the filters 210 and 310. The outlet vent passage valve 422*v*, the upstream vent passage valve 424*v*, and the upstream drain passage valve 426*v* are closed during normal filtering operations, i.e., when the upstream or inlet and downstream or outlet valves 418*v* and 420*v* are open to permit flow through the filter 410.

Draining or purging of liquid from the filter 410 is accomplished in the same manner as described further above for the filters 210 and 310, i.e., the inlet valve 418*v* is closed and the upstream vent passage valve 424*v* is opened to allow pressurized gas to force unfiltered liquid from the upstream volume portion 434 of the filter housing 412 through the filter element 430. The pressurized gas preferably passes through an inline filter 425 installed in the upstream vent passage 424. Once all of the liquid that can be purged through the filter element 430 has been recovered, any remaining unfiltered liquid in the filter housing 412 but outside of the filter element 430 is removed from the filter by opening the lower upstream volume drain passage valve 426*v*, the counterpart upstream volume vent passage valve 424*v* remaining open per the liquid recovery operation described above. This allows any remaining residual unfiltered liquid to flow freely from the filter housing or shell 412. The upstream volume vent passage valve 424*v* and upstream volume drain passage valve 426*v* are then closed and the outlet vent passage valve 422*v* is opened to allow the remaining filtered liquid to drain or to be purged or flushed from the filter core 432.

Figure 5:
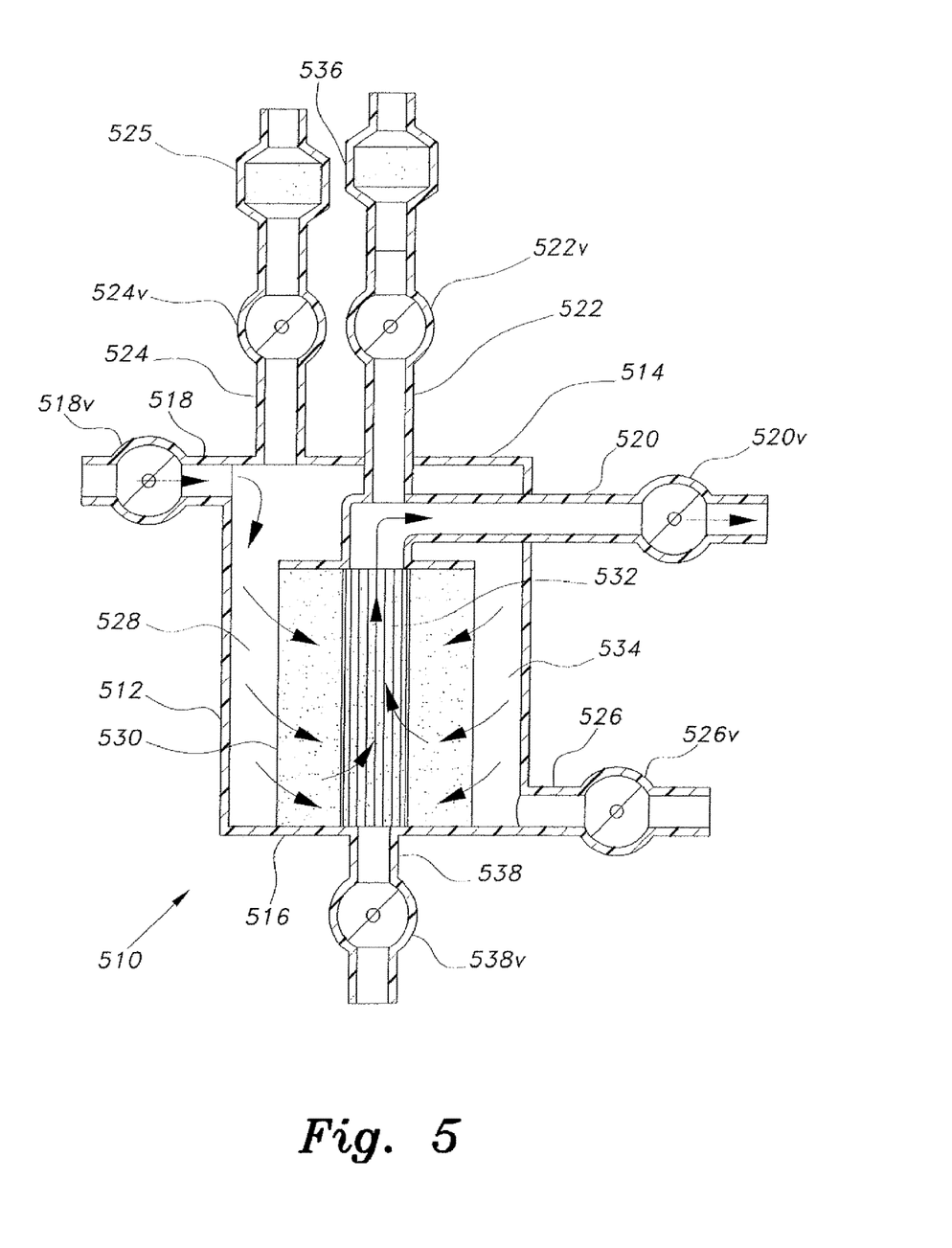
FIG. 5 is an elevation view in section of a liquid recovery filter according to the present invention having a generally T-shaped flow path, illustrating its internal configuration.
Figure 6:
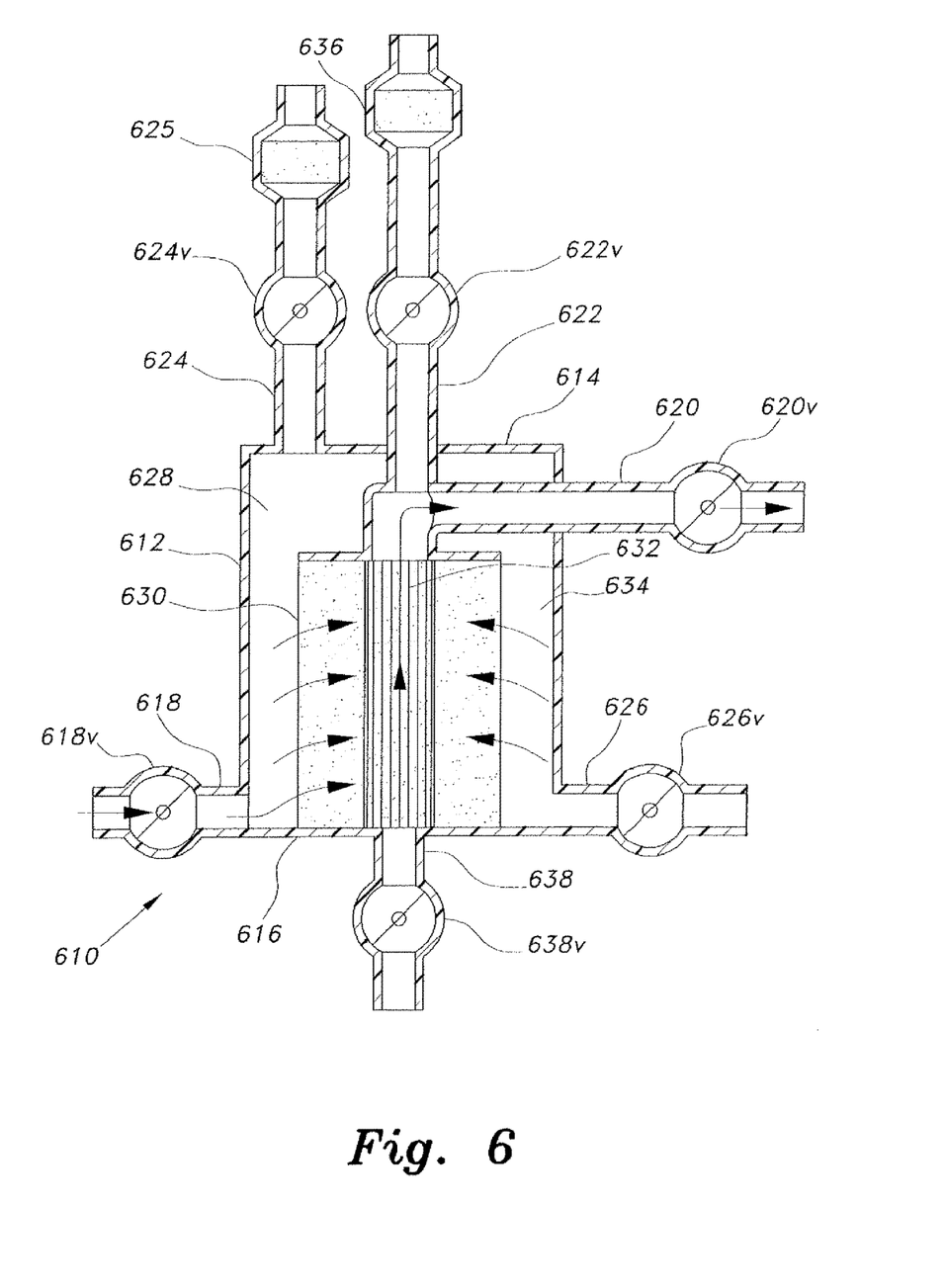
FIG. 6 is an elevation view in section of a liquid recovery filter according to the present invention having a generally S-shaped flow path, illustrating its internal configuration.

FIGS. 5 and 6 provide elevation views in section of additional embodiments of the liquid recovery filter. It will be seen that each of the filter embodiments of FIGS. 5 and 6 includes an additional drain passage or port communicating with the downstream or outlet core volume of the filter element. This is due to the placement of the downstream or outlet passage away from the filter core, which is relatively high in the filter housing.

FIG. 5 of the drawings provides an elevation view in section of a liquid recovery filter 510 having an additional drain passage, as described briefly above. For the most part, the filter 510 includes corresponding components to those described further above for the filters 210 through 410, i.e., a filter housing or shell 512 having mutually opposed first (or upper) and second (or lower) ends 514 and 516 defining an interior volume 528, and a toroidal filter element 530 captured therein. The filter element 530 and surrounding housing or shell 512 define an upstream or inlet volume 534 therebetween. The filter element 530 has a hollow core 532. An upstream vent passage 524 and its valve 524*v* extend from the upper or inlet end 514 of the shell 512. An opposite upstream or inlet side drain passage 526 and its valve 526*v* extend radially from the lower or downstream or outlet end 516 of the filter housing or shell 512.

The placement of the downstream or outlet passage or port 520 to extend substantially radially from the upper end 514 of the filter housing or shell 512 requires that the liquid passing through the filter 510 flow upward from the lower portions of the filter core 532 to exit the filter. Otherwise, liquid flow through the filter 510 is substantially as described further above for the other filter embodiments, i.e., the outlet vent passage valve 522*v*, the upstream vent passage valve 524*v*, and the upstream drain passage valve 526*v* are closed during normal filtering operations, and the upstream or inlet and the downstream or outlet valves 518*v* and 520*v* are open to permit flow through the filter 510. However, it will be seen that there is a sixth port or passage 538 and its valve 538*v* extending from the lower end 516 of the filter shell or housing 512 that are in communication with the filter core 532. This passage 538 serves as an outlet drain passage for draining the filter core 532. Its valve 538*v* must be closed during normal filtering operations. Liquid flow during normal filtering operations initially passes through the radially disposed upstream or inlet passage 518 and its normally open valve 518*v* at the upper end 514 of the filter housing or shell 512, and enters the interior volume 534 between the filter housing or shell 512 and the filter element 530. The liquid then passes through the filter element 530 and into the filter core 532, and then upward and out of the core 532 to flow from the radially disposed downstream or outlet passage 520 and its normally open valve 520*v* at the upper end 514 of the filter housing or shell 512.

Draining or purging of liquid from the filter 510 is accomplished in a procedure similar to the procedure described further above for the other filter embodiments, but there are some differences due to the upwardly disposed outlet passage 520. The inlet valve 518*v* is closed and the upstream vent passage valve 524*v* is opened to allow pressurized gas to force unfiltered liquid from the upstream volume portion 534 of the filter housing 512 through the filter element 530. The pressurized gas preferably passes through an inline filter 525 installed in the upstream vent passage 524. Once all of the liquid that can be purged through the filter element 530 has been recovered, any remaining unfiltered liquid in the filter housing 512 but outside of the filter element 530 is removed from the filter by opening the lower upstream volume drain passage valve 526*v*, the counterpart upstream volume vent passage valve 524*v* remaining open per the liquid recovery operation described above. This allows any remaining residual unfiltered liquid to flow freely from the filter housing or shell 512. The upstream volume vent passage valve 524*v* and the upstream volume drain passage valve 526*v* are then closed and the outlet vent passage valve 522*v* is opened to allow the remaining filtered liquid to drain or to be purged or flushed from the filter core 532. However, it will be seen that due to the high position of the downstream or outlet passage 520, the introduction of a purging gas through the vent passage 522 cannot flush liquid from the filter core 532. Accordingly, the outlet passage valve 520*v* is closed, and the outlet drain passage valve 538*v* communicating with the filter core 532 is opened to allow any liquid contained in the filter core 532 to flow downward, i.e., in the reverse direction of its flow during normal filtering operations, and out through the outlet drain passage 538 and its valve 538*v*.

FIG. 6 of the drawings provides an elevation view in section of a liquid recovery filter 610 having a configuration similar to that of the filter 510 of FIG. 5, i.e., having a filter outlet passage extending radially from the upper end portion 614 of the housing or shell 612. The filter 610 includes components corresponding to those described further above for the filter 510, i.e., a filter housing or shell 612 having mutually opposed first (or upper) and second (or lower) ends 614 and 616 defining an interior volume 628, and a toroidal filter element 630 captured therein. The filter element 630 and surrounding housing or shell 612 define an upstream or inlet volume 634 therebetween. The filter element 630 has a hollow core 632. An upstream vent passage 624 and its valve 624v extend from the upper or inlet end 614 of the shell 612. An opposite upstream or inlet side drain passage 626 and its valve 626v extend radially from the lower or downstream or outlet end 616 of the filter housing or shell 612.

Liquid flow through the filter 610 is substantially as described further above for the filter embodiment 510. The outlet vent passage valve 622v, the upstream vent passage valve 624v, and the upstream drain passage valve 626v are closed during normal filtering operations, and the upstream or inlet and downstream or outlet valves 618v and 620v are open to permit flow through the filter 610. The outlet drain passage valve 638v is also closed during normal filtering operations. Liquid flow during normal filtering operations initially passes through the radially disposed upstream or inlet passage 618 and its normally open valve 618v at the lower end 616 of the filter housing or shell 612, and then enters the interior volume 634 between the filter housing or shell 612 and the filter element 630. The liquid then passes through the filter element 630 and into the filter core 632, and upward out of the core 632 to flow from the radially disposed downstream or outlet passage 620 and its normally open valve 620v at the upper end 614 of the filter housing or shell 612.

Draining or purging of liquid from the filter 610 is accomplished essentially as described further above for the liquid recovery filter 510 of FIG. 5. The inlet valve 618v is closed and the upstream vent passage valve 624v is opened to allow pressurized gas to force unfiltered liquid from the upstream volume portion 634 of the filter housing 612 through the filter element 630. The pressurized gas preferably passes through an inline filter 625 installed in the upstream vent passage 624. Once all of the liquid that can be purged through the filter element 630 has been recovered, any remaining unfiltered liquid in the filter housing 612 but outside of the filter element 630 is removed from the filter by opening the lower upstream volume drain passage valve 626v, the counterpart upstream volume vent passage valve 624v remaining open per the liquid recovery operation described above. This allows any remaining residual unfiltered liquid to flow freely from the filter housing or shell 612. The upstream volume vent passage valve 624v and the upstream volume drain passage valve 626v are then closed and the outlet vent passage valve 622v is opened to allow the remaining filtered liquid to drain or to be purged or flushed from the filter core 632. However, it will be seen that due to the high position of the downstream or outlet passage 620, the introduction of a purging gas through the vent passage 622 cannot flush liquid from the filter core 632. Accordingly, the outlet passage valve 620v is closed, and the outlet drain passage valve 638v communicating with the filter core 632 is opened to allow any liquid contained in the filter core 632 to flow downward, i.e., in the reverse direction of its flow during normal filtering operations, and out through the outlet drain passage 638 and its valve 638v.

Accordingly, the various embodiments of the liquid recovery filter serve well for the recovery of costly liquids in filtering operations in the pharmaceutical and other industries where applicable. It will be seen that the various axial and radial configurations of the various inlet and outlet passages or ports illustrated in the drawings and described herein are exemplary, and that various other arrangements of these ports or passages may be provided, so long as means is provided for the drainage or removal of liquid from the filter housing or shell, and particularly for the drainage or removal of filtered liquid from the core of the filter, It is to be understood that the present invention is not limited to the embodiments described above, but encompasses any and all embodiments within the scope of the following claims.

We claim:

1. A liquid recovery filter comprising:
    a filter shell having an upper end, a lower end opposite the upper end, and a cylindrical outer wall extending between the upper end and the lower end, the shell defining an internal volume;
    a filter element disposed within the filter shell, whereby a gap formed between the shell and the filter element defines an upstream section of the internal volume, the filter element having an inlet side and an outlet core, the inlet side of the filter element communicating fluidly with the upstream section;
    an inlet passage extending substantially radially from a first point on the filter shell cylindrical outer wall, the inlet passage communicating fluidly with the upstream section;
    an outlet passage extending substantially radially from a second point on the filter shell cylindrical outer wall, wherein the second point is located on a side of the cylindrical outer wall opposite the location of the first point,
    the outlet passage communicating fluidly with the outlet core of the filter element;
    a downstream vent passage port/purge port disposed through the filter shell, the downstream vent passage port/purge port communicating fluidly with the outlet core of the filter element; and,
    an inline gas filter disposed in the downstream vent passage port/purge port, wherein the inline gas filter permits the sterile introduction of a gas into the downstream section through the vent passage port/purge port to purge processed liquids retained in the downstream section after filtering of the processed liquids by the filter element.

2. The liquid recovery filter according to claim 1 wherein the downstream vent passage port/purge port is disposed through the upper end of the filter shell.

3. The liquid recovery filter according to claim1 further comprising an outlet drain passage disposed through the filter shell, the outlet drain passage communicating fluidly with the outlet core of the filter element.

4. The liquid recovery filter according to claim 3 wherein the outlet drain passage is disposed through the lower end of the filter shell.

5. The liquid recovery filter according to claim 3 further comprising an upstream vent passage disposed through the filter shell, the upstream vent passage communicating fluidly with the upstream section.

6. The liquid recovery filter according to claim 1 further comprising an upstream vent passage disposed through the filter shell, the upstream vent passage communicating fluidly with the upstream section.

7. The liquid recovery filter according to claim 6 further comprising an upstream drain passage disposed through the filter shell, the upstream drain passage communicating fluidly with the upstream section.

8. The liquid recovery filter according to claim 1 further comprising an upstream drain passage disposed through the filter shell, the upstream drain passage communicating fluidly with the upstream section.

9. The liquid recovery filter according to claim 1 further comprising:
an upstream drain passage disposed through the filter shell, the upstream drain passage communicating fluidly with the upstream section;
an upstream vent passage disposed through the filter shell, the upstream vent passage communicating fluidly with the upstream section; and,
an outlet drain passage disposed through the filter shell, the outlet drain passage communicating fluidly with the outlet core of the filter element.

10. The liquid recovery filter according to claim 6 further comprising an inline gas filter disposed in the upstream vent passage.

11. A liquid recovery filter comprising:
a filter shell having an upper end, a lower end opposite the upper end, and a cylindrical outer wall extending between the upper end and the lower end, the shell defining an internal volume;
a filter element disposed within the filter shell, whereby a gap formed between the shell and the filter element defines an upstream section of the internal volume, the filter element having an inlet side and an outlet core defining a downstream section, the inlet side of the filter element communicating fluidly with the upstream section;
an inlet passage extending substantially radially from the lower end of the filter shell at a first point on the cylindrical outer wall, the inlet passage communicating fluidly with the upstream section;
an outlet passage extending substantially radially from the upper end of the filter shell at a second point on the cylindrical outer wall, wherein the second point is located on a side of the cylindrical outer wall opposite the location of the first point so that the outlet passage is located generally diametrically opposite the inlet passage, the outlet passage communicating fluidly with the outlet core of the filter element;
a downstream vent passage port/purge port disposed through the filter shell, the downstream vent passage port /purge port communicating fluidly with the outlet core and downstream section of the filter element; and,
an inline gas filter disposed in the downstream vent passage port/purge port, wherein the inline gas filter permits the sterile introduction of a gas into the downstream section through the vent passage port/purge port to purge processed liquids retained in the downstream section after filtering of the processed liquids by the filter element.

12. The liquid recovery filter according to claim 11 wherein the downstream vent passage port/purge port is disposed through the upper end of the filter shell.

13. The liquid recovery filter according to claim 11 further comprising an outlet drain passage disposed through the filter shell, the outlet drain passage communicating fluidly with the outlet core of the filter element.

14. The liquid recovery filter according to claim 13 wherein the outlet drain passage is disposed through the lower end of the filter shell.

15. The liquid recovery filter according to claim 13 further comprising an upstream vent passage disposed through the filter shell, the upstream vent passage communicating fluidly with the upstream section.

16. The liquid recovery filter according to claim 14 further comprising an upstream vent passage disposed through the filter shell, the upstream vent passage communicating fluidly with the upstream section.

17. The liquid recovery filter according to claim 15 further comprising an upstream drain passage disposed through the filter shell, the upstream drain passage communicating fluidly with the upstream section.

18. The liquid recovery filter according to claim 11 further comprising an upstream drain passage disposed through the filter shell, the upstream drain passage communicating fluidly with the upstream section.

19. The liquid recovery filter according to claim 11 further comprising:
an upstream drain passage disposed through the filter shell, the upstream drain passage communicating fluidly with the upstream section;
an upstream vent passage disposed through the filter shell, the upstream vent passage communicating fluidly with the upstream section; and,
an outlet drain passage disposed through the filter shell, the outlet drain passage communicating fluidly with the outlet core of the filter element.

20. The liquid recovery filter according to claim 15 further comprising an inline gas filter disposed in the upstream vent passage.

* * * * *